March 28, 1961 P. SCHLADERMUNDT ET AL 2,976,916
SPRINGLESS CUSHION
Filed Jan. 15, 1958 2 Sheets-Sheet 1
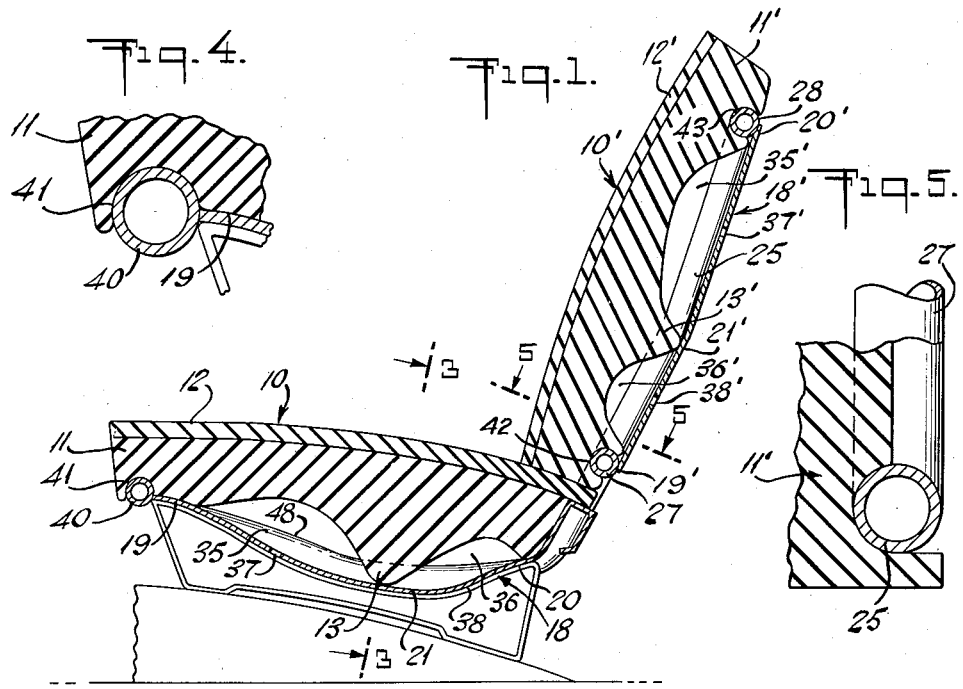
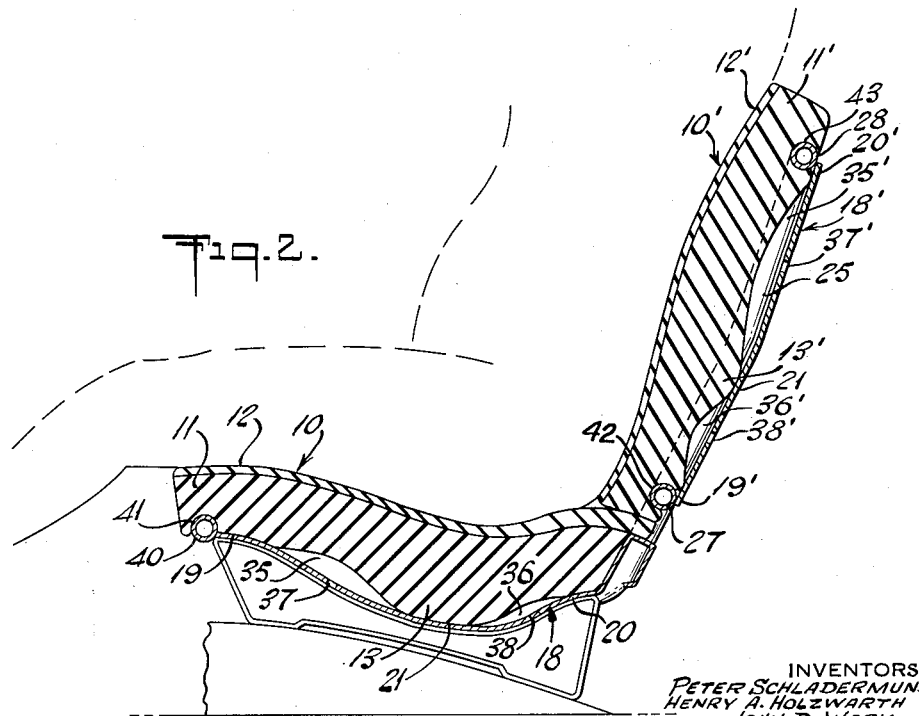
INVENTORS
PETER SCHLADERMUNDT
HENRY A. HOLZWARTH
BY JOHN D. WARK
Burgess, Ryan, & Hicks
ATTORNEYS March 28, 1961 P. SCHLADERMUNDT ET AL 2,976,916
SPRINGLESS CUSHION
Filed Jan. 15, 1958 2 Sheets-Sheet 2
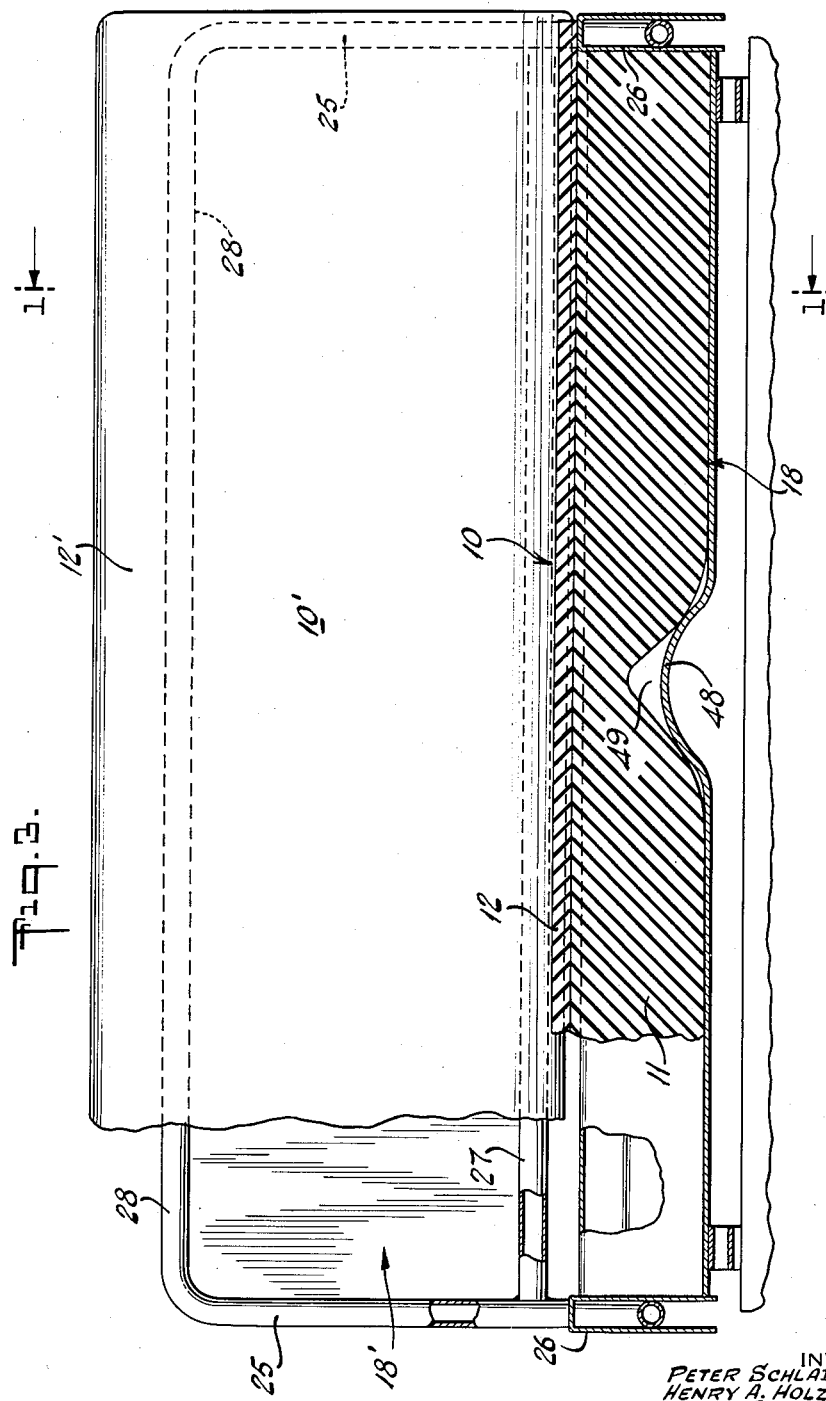
INVENTORS
PETER SCHLADERMUNDT
HENRY A. HOLZWARTH
BY JOHN D. WARK
Burgess, Ryan, & Hicks
ATTORNEYS

United States Patent Office 2,976,916
Patented Mar. 28, 1961

2,976,916

SPRINGLESS CUSHION

Peter Schladermundt, Bronxville, Henry A. Holzwarth, Levittown, and John D. Wark, Freeport, N.Y., assignors to Hewitt-Robins Incorporated, New York, N.Y., a corporation of New York Filed Jan. 15, 1958, Ser. No. 709,013

7 Claims. (Cl. 155—178)

This invention relates to the art of cushioning seats and back rests without resort to the use of conventional springs. While of particular utility in the cushioning of automobile seats and back rests, the invention is by no means limited thereto since, as will appear, it provides advantages from the standpoint of comfort, simplicity and also economy which make it useful, also for other conveyances, as well as for furniture.

In general, the invention comprises a cushion unit made of one or another of the foam type cushioning materials and of such shape that, when appropriately supported, it and its support provide a seat or back rest structure meeting all of the requirements of good seating in an extremely simple manner. While the cushion unit is not limited to any specific material, the urethane foams have been found to be particularly desirable, due to the readiness with which they can be compounded to provide a wide range of resilience and stiffness characteristics. Also, the urethane foams have a much better shock absorbing ability than conventional foam rubber materials. If preferred for some special application, however, a composite cushion unit may be used, such as a main body of urethane foam with a relatively thin topping of foam rubber bonded to it.

The cushion unit is characterized by the provision of a primary hump or protuberance on its nether side (its under side in the case of a seat and its rear side in the case of a back rest) which is of tapering or outwardly diminishing cross section and the unit is so supported that what will be termed the apex of the hump is compressed toward or into the body portion of the unit under load whereby progressively increasing resistance to penetration of the unit by the load is offered.

The details of the invention will be understood from the following description and the accompanying drawings which show a preferred form of the invention applied to the cushioning of an automobile seat and back rest. In the drawings:

Fig. 1 is a vertical section of an automobile seat embodying the invention, the section being taken on the line 1—1 of Fig. 3;

Fig. 2 is a similar section showing the seat and back cushion units under load;

Fig. 3 is a transverse section on the line 3—3 of Fig. 1; and

Figs. 4 and 5 are enlarged details.

It will be understood that the details of the framework or supporting structure of the particular seat or back rest to which the invention is to be applied may vary widely and that, except as indicated herein, the somewhat schematic showing of the framework of the automobile seat to be described is illustrative only. As will presently be apparent, the invention is equally applicable to individual seats (as of the bucket type in the case of automobiles) as well as to seats of the illustrated bench type.

To simplify the description, the seat cushion unit will be described in detail and the corresponding elements of the back rest cushion unit identified by corresponding primed reference characters.

In this instance the seat cushion unit, generally designated 10, consists of a relatively thick slab or pad of urethane foam 11 having bonded thereto an outer, relatively thin layer 12 of foam rubber; and on its nether side the cushion unit has what will be termed an initial load support hump 13 protruding therefrom. This hump is of outwardly diminishing cross section or taper ("outwardly" being used herein to mean away from the face or body contact surface; in other words, downwardly in the case of the seat unit and rearwardly in the case of the back unit). As shown, the hump is in the form of a rib which extends transversely of the seat, that is, in a side-to-side direction, and is of more or less triangularly shaped section, terminating in a smoothly rounded apex. It will be understood that this is the shape in which the foam unit is molded, the hump being disposed opposite to what in use is the maximum load zone of the cushion.

The cushion unit is mounted on a base or back providing suitably located peripheral support surfaces and a support surface for the apex of the hump. In this preferred form the base consists of a rigid metal pan 18 incorporating front and rear support surfaces 19, 20 and an intervening depressed section 21. The back pan 18' is shown as supported by a tubular framework including side members 25 (Fig. 3) extending up from seat end channels 26 and also including cross members 27, 28, these components being welded or otherwise secured to one another as may be appropriate for the particular installation. Whatever the particular form of the base, it will be recognized that it and its cushion unit provided a cushioned structure which is extremely simple and may incorporate a minimum of components and, at the same time, occupy a minimum of space. Particularly in the case of automobile installations where, with the present styling, headroom is at a premium, the compactness of the seat assembly is particularly advantageous. As will be understood, the seat base may be floor-supported in any conventional or preferred way.

The conventional foam cushion, or pillow, with its substantially uniform coring, offers the same resistance to load penetration throughout and this resistance, of course, has to be adequae to prevent bottoming in the maximum load zone. The result has been a cushion which has been described as having a tendency to fight back and to give the sitter a feeling of instability.

The cushion of the present invention, by contrast, not only provides maximum support where most needed, but also introduces a varying resistance factor which is automatically responsive to the applied load. Thus, as the cushions are loaded, the apices of the humps are compressed and, due to their tapered cross section, they progressively engage a larger support area and hence offer progressively increasing resistance. The initial penetration is thus soft and comfortable and it is followed by a rapid firming up in and about the maximum load zone.

The loaded condition is indicated in Fig. 2. It will be seen that the cavities or voids 35, 36 intermediate the humps and the edge portions of the cushions are much reduced from their Fig. 1 dimension due to the described compression and spreading of the hump and due also, of course, to the enlarged contact area at the edges of the cushion units. It will be recognized that under such loading (or to whatever extent the particular loading may deform the units) the cushions are under maximum compression in the hump zone and are much less compressed in the intermediate surrounding zones and these conditions have been found to afford a high degree of comfort. When shocks are encountered, too, the resistance build up action of the hump is found to have a stabilizing action and to minimize undue bounce.

If an otherwise imperforate support pan is utilized it is desirable to provide one or more openings 37, 38 to vent the voids 35, 36 so that the air trapped therein will not escape under and displace the edges of the cushion units. As will be recognized, the size and number of such openings may be utilized to control the rate of venting.

Means may also be provided to position the cushion units on their supports and to restrain the cushion units against sliding movement relative to their supports. In the form illustrated, such means are shown as interengaging recesses and projections incorporated in the nether surfaces of the cushion units and their supports. Thus, a bar 40 at the front edge of the pan fits into a groove or recess 41 formed in the cushion unit at the forward edge thereof. Similarly, the back cushion unit is shown provided with grooves or recesses 42, 43 the walls of which embrace the cross bars 27, 28. The side bars 25 may be similarly recessed into the back cushion adjacent its ends (Fig. 5).

In the case of an elongated or bench type automobile seat, such as is illustrated, provision may be made to adapt the seat cushion and its support to accommodate them to the usual center-rise in the car floor, over the transmission. As shown particularly in Fig. 3, the pan 18 is provided with a corresponding or appropriately rounded ridge 48 which extends from front to rear of the central portion of the base. However, in order to afford comparable comfort in the center seating position, the rib 18 is interrupted by a channel 49 of inverted V shape. Thus, when the center seat is loaded, the sides of the seat channel are pressed downwardly and engage an increasingly larger area of the ridge 48, thereby firming up the center cushion area.

While no fabric or other covering for the cushion units has been indicated, it will be understood that they may be enclosed or partially covered with any appropriate material in accordance with standard practices.

It will also be understood that the foregoing description is merely illustrative of the principle of the invention and that the details are subject to modification to meet the requirements of the particular type or style of seat.

In the light of the foregoing, the following is claimed:

1. A cushioned structure comprising a rigid pan incorporating front and rear support surfaces and an intervening, depressed section, a cushion unit seated front and rear on said support surfaces and having on its nether side opposite to the maximum load zone of the unit a transversely extending rib of outwardly tapering section, with the apex of the rib engaging the depressed section of the pan, the remainder of the nether side of the cushion unit between the rib and the support surfaces being spaced from the depressed section of the pan, the said support surfaces of the pan and the surfaces of the unit seated thereon having interengaging portions, said portions positioning the cushion unit on the pan and restraining said unit against sliding movement relative to the pan and the cushion unit being of foam material yieldable under load to compress the rib against the depressed section of the pan and thereby, due to the tapering section of the rib, to offer progressively increasing resistance to penetration of the cushion unit by the load, the said pan having openings therein to vent the voids between the pan and those nether surfaces of the cushion unit which are spaced therefrom.

2. A seat structure comprising a rigid base incorporating peripheral cushion support sufaces and an intervening, depressed section, a cushion unit having peripheral portions seated on said support surfaces and having on its nether side opposite to the maximum load zone of the unit a protruding hump of outwardly tapering section, with the apex of the hump engaging the depressed section of the base, the remainder of the nether side of the cushion unit between the hump and the support surfaces being spaced from and out of contact with the depressed section, the cushion unit being of foam material yieldable under load to compress the hump against the base and thereby, due to the tapering section of the hump, to cause it to progressively engage a larger support area and hence to offer progressively increasing resistance to penetration of the cushion unit by the load and means for restraining the cushion unit against sliding movement relative to the base.

3. A seat structure comprising a rigid base incorporating peripheral cushion support surfaces and an intervening, depressed section, a cushion unit having peripheral portions seated on said support surfaces and having on its nether side opposite to the maximum load zone of the unit a protruding hump of outwardly tapering section, with the apex of the hump engaging the depressed section of the base, the remainder of the nether side of the cushion unit between the hump and the support surfaces being spaced from and out of contact with the depressed section, the cushion unit being of foam material yieldable under load to compress the hump against the base and thereby, due to the tapering section of the hump, to cause it to progressively engage a larger support area and hence to offer progressively increasing resistance to penetration of the cushion unit by the load, and vent means for the voids between the pan and those nether surfaces of the cushion unit which are spaced therefrom.

4. A seat structure comprising a rigid base incorporating peripheral cushion support surfaces and an intervening, depressed section, a cushion unit having peripheral portions seated on said support surfaces and having on its nether side beneath the maximum load zone of the unit a protruding hump of outwardly tapering section, with the apex of the hump disposed to engage the depressed section of the base, portions of the nether side of the cushion unit located on opposite sides of the hump and between the hump and the support surfaces being spaced from and out of contact with the depressed section, the cushion unit being of foam material yieldable under load to compress the hump against the base and thereby, due to the tapering section of the hump, to cause it to progressively engage a larger support area and hence to offer progressively increasing resistance to penetration of the cushion unit by the load.

5. An elongated seat structure comprising a rigid base incorporating peripheral cushion support surfaces, a ridge extending from front to rear of the central portion of the base and, intermediate its front and rear and on each side of the ridge, a depressed section, a cushion unit having peripheral portions seated on said support surfaces and having on its nether side of a pair of protruding humps of outwardly tapering section, with the apices of the humps disposed to engage the respective depressed sections of the base, portions of the nether side of the cushion unit between the respective humps and the support surfaces being spaced from and out of contact with the depressed sections, the cushion unit being of foam material yieldable under loads to compress the humps against the base and thereby, due to the tapering section of the humps, to cause them to progressively engage larger support areas and hence to offer progressively increasing resistance to penetration of the cushion unit by the loads, the nether surface of the cushion unit incorporating a channel extending from front to rear above the said ridge.

6. An elongated seat structure as claimed in claim 5 in which the said ridge is of arcuate cross section and in which the said channel is of inverted substantially V-shaped cross section.

7. The combination comprising a foam cushion unit having an initial load supporting hump of outwardly diminishing cross-section protruding from its nether surface, said hump being located opposite the maximum load zone of the unit, a substantially rigid support positioned in opposing relation to said hump, said support including portions extending on opposite sides of the hump, said portions normally being spaced from the nether side of the unit when said unit is in unloaded condition and progressively engaging with the nether side of the unit adjacent the hump as the hump is compressed under load and substantially rigid support means engaging with the unit at peripheral edges thereof.

References Cited in the file of this patent

UNITED STATES PATENTS

| | | |
|---|---|---|
| 2,159,520 | Chapman | May 23, 1939 |
| 2,836,228 | Dahle | May 27, 1958 |

FOREIGN PATENTS

| | | |
|---|---|---|
| 66,767 | France | Mar. 18, 1957 |